US007469343B2

(12) United States Patent
Ray et al.

(10) Patent No.: US 7,469,343 B2
(45) Date of Patent: Dec. 23, 2008

(54) DYNAMIC SUBSTITUTION OF USB DATA FOR ON-THE-FLY ENCRYPTION/DECRYPTION

(75) Inventors: Kenneth Ray, Seattle, WA (US); Theodore Kehl, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 823 days.

(21) Appl. No.: 10/428,251

(22) Filed: May 2, 2003

(65) Prior Publication Data

US 2004/0250087 A1 Dec. 9, 2004

(51) Int. Cl.
*G06F 21/04* (2006.01)
(52) U.S. Cl. ...................................... 713/189
(58) Field of Classification Search .................. 713/189
See application file for complete search history.

(56) References Cited

U.S. PATENT DOCUMENTS

| | | | | |
|---|---|---|---|---|
| 5,596,718 | A * | 1/1997 | Boebert et al. | 726/16 |
| 6,061,794 | A | 5/2000 | Angelo et al. | 713/200 |
| 6,094,486 | A * | 7/2000 | Marchant | 380/52 |
| 6,389,029 | B1 * | 5/2002 | McAlear | 370/402 |
| 6,971,048 | B1 * | 11/2005 | Hanson et al. | 714/41 |
| 7,043,589 | B2 * | 5/2006 | Chang et al. | 710/305 |
| 2004/0230840 | A1 * | 11/2004 | Radatti | 713/201 |

FOREIGN PATENT DOCUMENTS

| | | |
|---|---|---|
| WO | WO 01/31459 A1 | 5/2001 |
| WO | WO 0131459 A1 * | 5/2001 |

OTHER PUBLICATIONS

Blake-Wilson, S. et al., "Universal Serial Bus Content Security Method 4 Elliptic Curve Content Protection Protocols", *USB CSM-4ECCPP Specification, Revision 0.9*, Jan. 31, 2000, 16 pages, XP-002351862.

* cited by examiner

*Primary Examiner*—Kambiz Zand
*Assistant Examiner*—William S Powers
(74) *Attorney, Agent, or Firm*—Woodcock Washburn LLP

(57) ABSTRACT

A security module and method implements data requests from a USB or other similar device, in which a secure component can communicate securely with a device without modifying the underlying USB bus protocol, or the device, even where the software controlling the bus is untrusted. A security module (physically separate or integrated into a device or hub) intercepts data being sent from device to secure component in response to a data request. A "not acknowledged" signal is sent to the secure component, and the data is encrypted. The next data request is intercepted, and the encrypted data sent in response. The acknowledgement from the secure component to the device is allowed to reach the device. In order to handle a setup request, an allow command is sent to the security module, which includes the encrypted and unencrypted setup command. If an encryption check is successful, a setup command sent to the device (via the security module) is allowed to reach the device.

32 Claims, 6 Drawing Sheets

DYNAMIC SUBSTITUTION OF USB DATA FOR ON-THE-FLY ENCRYPTION/DECRYPTION

FIELD OF THE INVENTION

The invention relates to methods and systems for protecting digital data, and, more particularly, to methods and systems for protecting digital data being transferred using the universal serial bus (USB) architecture and protocol or a similar architecture and protocol.

BACKGROUND OF THE INVENTION

In a computer system, peripherals and other devices may be attached to a computer system by means of a bus, such as a USB bus. A computer system utilizing a USB bus will include a USB software layer that will interact with applications and mediate the sending and receipt of data from a central host to the peripherals.

The USB software layer supports generic USB hardware. The USB software layer is complex and flexible, in order to support the USB communication. The USB software layer preferably supports multiple independent hardware vendors' drivers and must remain pluggable. Therefore, the USB software layer may be changed often in order to respond to challenges such as changes in hardware or other updates. Moreover, there are a large number of different USB hardware elements available, and the USB software layer is preferably able to support this multiplicity of options.

Because the data on the USB bus is passed through an insecure USB software layer and this data is also available to any device on the bus, security is a concern. For example, a computer model may include a secure component, software or hardware, which requires data to be passed over the USB bus. However, it is desirable for simplicity, flexibility, and upgradeability that the USB software layer not be part of that secure software component. However, if the USB software layer is not part of the secure software component, the security implemented in the secure software component is imperiled.

A software or hardware attack may make the system vulnerable. For example, it may be possible for an attacker to spoof device inputs from a hardware device, so that the user's typed information is not sent to the application to which the data was directed. It may also be possible for the attacker to sniff device inputs, for example, saving the user's keystrokes to gain passwords or other data information. Recording, modification or replay of inputs is also possible through software attacks in the computer.

If secure software is running on a computer system, communications with the USB devices must go through the insecure USB software and the bus. Such devices are often necessary for display and input purposes to a user. Thus, for secure software to be secure, the inputs and outputs to the secure software must be secured as well If secure software does not have a secure path to the user, then the secure software has no way of knowing that the action it takes are actually on behalf of the user. First, an attacker could manufacture user input (input that did not come from the user, and thus was not the user intent) to trick the secure software into behavior the legitimate user did not intend. Second, if the output for the trusted software does not go directly to the user through a secure path then the legitmate user has no assurance that the user is actually seeing the real output from the secure software. However, the USB protocol is a standard in the computer industry, and modifying the USB protocol or architecture to provide security would remove the advantages of using a widely available and widely implemented architecture.

Thus, there is a need for a way to provide the benefits of USB connectivity and compatibility with existing USB devices and systems, while allowing for increased security.

SUMMARY OF THE INVENTION

The present invention provides for encryption/decryption facilities in a security module to be provided for a USB device. Specifically, the present invention provides for communications between a device and a secure component, such as commands requesting data from the device, the data returned by that device back to the system and setup commands for configuring the device to be securely handled, even where those commands and data are passing over unsecure hardware and/or software to get to the secure component.

The encryption/decryption may be provided in a physically separate apparatus, for example, a piece of hardware (a "dongle") that is placed in the connecting wire between the USB device and the host or hardware that a USB device plugs into or as a separate device into which an unmodified USB device plugs. Alternately, the encryption/decryption facilities may be built in to the device, for example, a keyboard with hardware encryption/decryption built in, or integrated into the functionality of the upstream hub.

A device may have several endpoints associated with different functional portions of the device. Therefore, in one embodiment, the security dongle handles security for all interfaces and all endpoints on the device.

According to one embodiment of the invention, when the USB device receives a payload to transmit to the secure component, for example, a HID (human interface driver) packet such as a keystroke, or a mouse stroke, the payload is sent in the clear from the device upstream to the dongle, encrypted in the dongle, and sent encrypted to the host. The substitution of the encrypted payload is transparent to the USB host controller and transparent to the device.

Additionally, the dongle prevents all unauthorized SETUP packets from the system to the device so as to ensure this transparency. The secure software sends a "signed" ALLOW command to the dongle prior to that dongle allowing any SETUP command to be sent the device. And once the dongle receives the ALLOW command it only allows the specific SETUP command specified. Thus, when a SETUP command is to be performed, a preliminary ALLOW command is sent, with data including the setup command data and an encrypted version of the setup command data. When the data is verified (e.g. by ensuring that the ALLOW command was signed by the secure software, in one embodiment by adding a hash using the shared secret between the dongle and the secure software) the dongle allows a SETUP command addressed to the endpoint with matching command data to be transmitted to and executed on the endpoint.

When the secure application wants to request data from the secured endpoint, the secure application uses the USB system software in the standard way to send the request to a specific endpoint. However the dongle changes the way this request token goes to the endpoint and the way the data is returned back the host system software in the following way: When USB system software then sends a token to the endpoint, the token is intercepted by the security module. The security module sends the token on to the device, but sends a NAK to the host. When the device responds to the poll with data, the data is stored and encrypted by the security module. When a repeat poll is detected by the security module for the device and endpoint, the request is "smashed" by the security module. ("Smashing" is a term which, in the USB arena, means that the data is sent in such a way as to indicate a transmission error.) The security module sends the encrypted data as a response to the second poll, and when the host acknowledges receipt with an ACK signal, that is passed on by the security module to the device.

When the secure embodiment wants to send data to a secured device, it first sends a request to the security module itself. An ALLOW token is sent to the security module. As a part of this packet, the command (such as a SETUP command, which contains a command for a USB device) is transmitted as the data of the ALLOW token. The security module verifies the ALLOW command to determine that it came from the secure software and saves this data. Then, when a new command token is passed to the security module, if the command token matches the command token which was sent as data in the ALLOW command, the setup command is passed on to the device. The rest of the SETUP protocol continues on the USB bus as normal. If the SETUP command does not match a previously received ALLOW command, the dongle smashes the SETUP command before it can finish.

Other aspects of the present invention are described below.

BRIEF DESCRIPTION OF THE DRAWINGS

The security module, in accordance with the present invention are further described with reference to the accompanying drawings in which.

DETAILED DESCRIPTION OF ILLUSTRATIVE EMBODIMENTS

Exemplary Computing Environment

Figure 1:
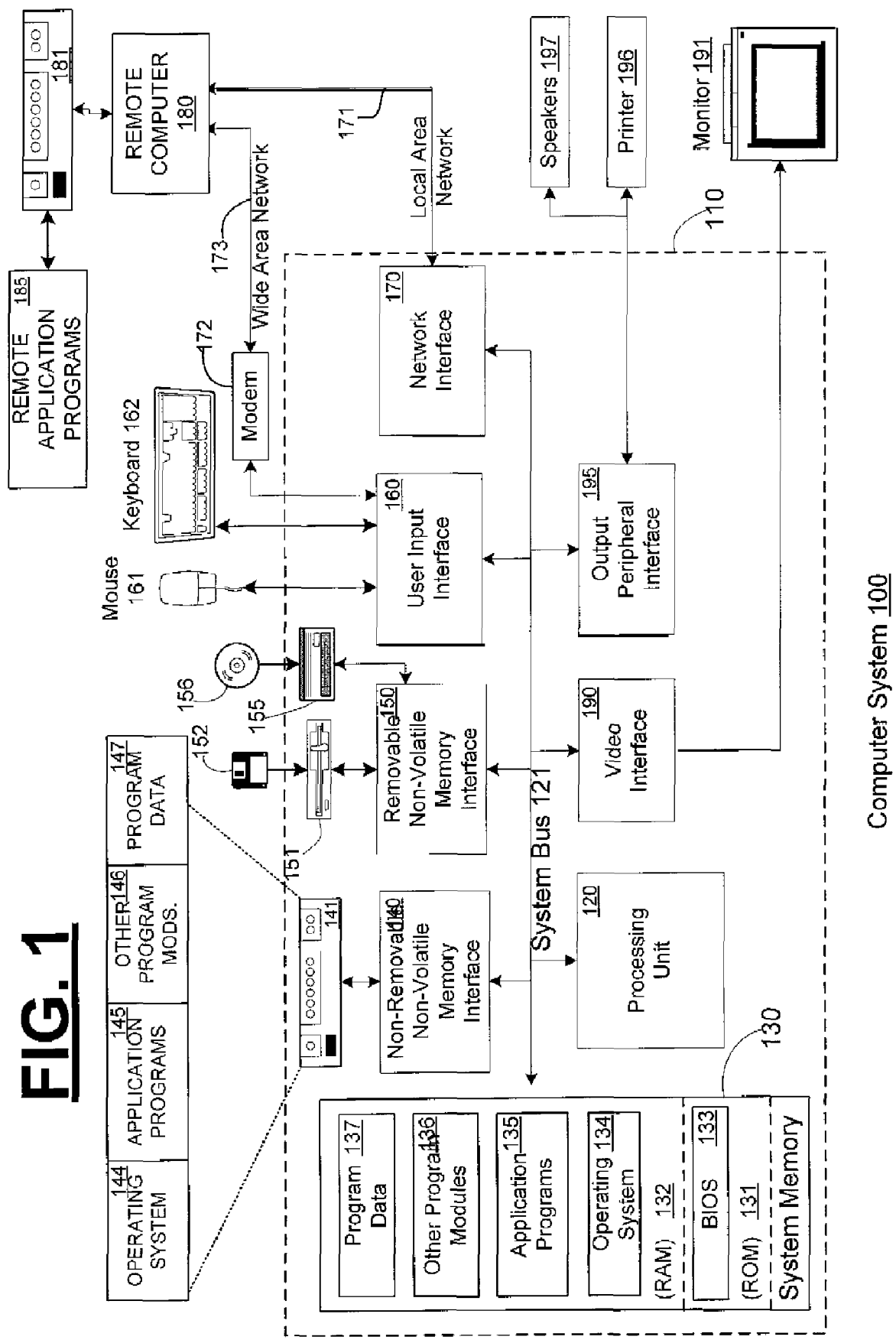
FIG. 1 is a block diagram representing a computer system in which the present invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices. Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the techniques of the present invention.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium that can be used to store the desired information and that can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

USB Protocol

Figure 2:
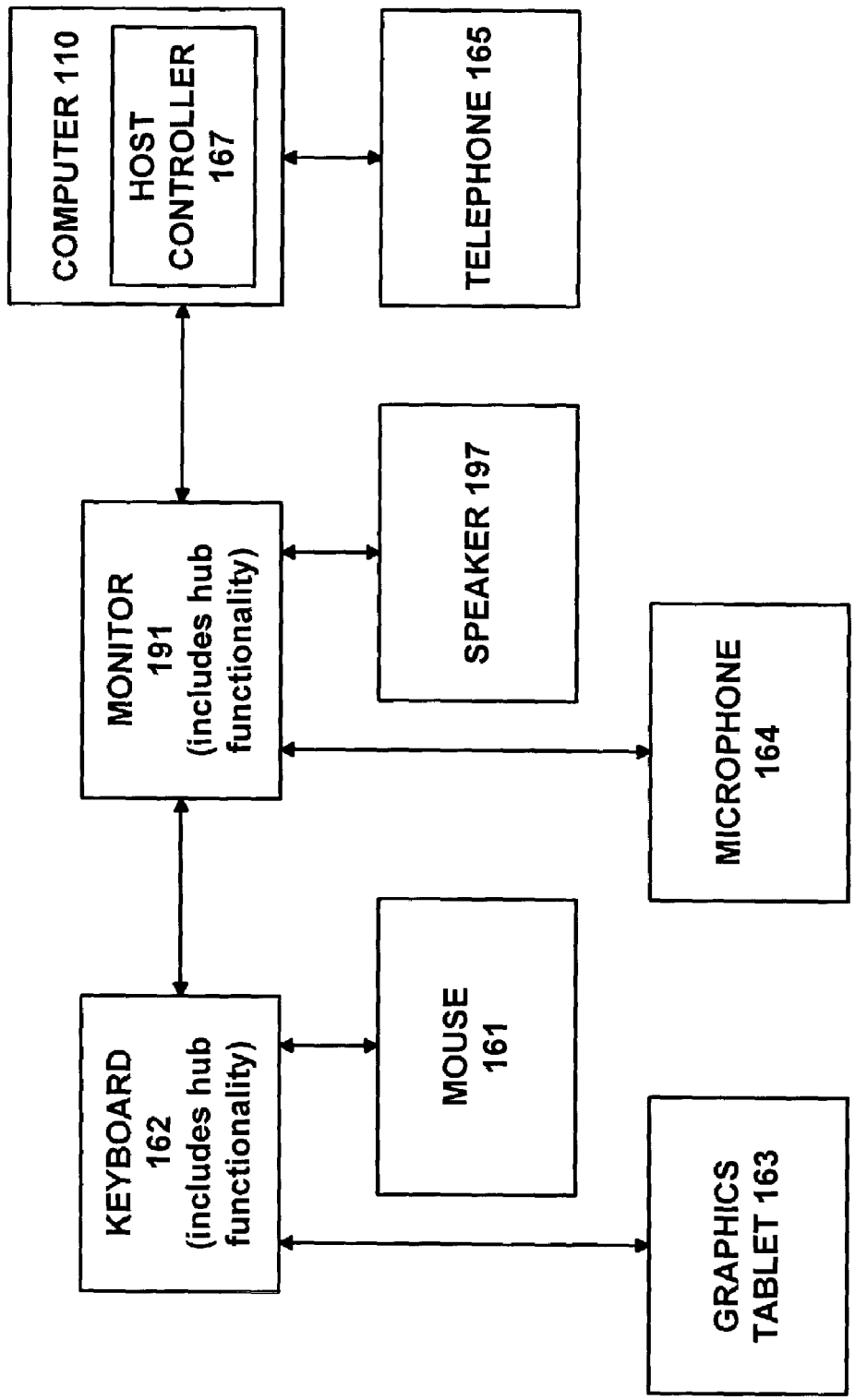
FIG. 2 is a block diagram representing a computer system including a computer and other devices attached by USB in which the present invention may be implemented.

The USB architecture provides a way for devices to be connected to and communicate with a host. For example, as shown in FIG. 2, a universal serial bus (USB) may be used to connect a mouse 161, keyboard 162, graphics tablet 163, speaker 197, microphone 164, telephone 165, and monitor 191 to a computer 110. The USB architecture allows for connections between one or more USB devices and one USB host. Generally, in such a configuration, computer 110 is the USB host.

The physical interconnection used is a star topology. To prevent circular attachments, a tiered ordering is imposed on the star topology. The result is the tree-like topology shown in FIG. 2. A hub is at the center of each star. The USB host is one hub. USB devices with functionality may also be hubs. For example, in FIG. 2, keyboard 162 and monitor 191 are each devices that are also functioning as hubs. Hubs without any separate functionality are also possible in a USB topology.

Additionally, multiple functions may be packaged together in what appears to be a single physical device. For example, a keyboard and pointing device (such as a trackball) might be combined together in a single package. When multiple functions are combined with the hub in a single package, they are referred to as a compound device. The hub and each function attached to the hub within the compound device are assigned its own device address. For example, in keyboard 162, the hub and the keyboard functionality will each have a separate device address.

The host includes a USB interface to the host computer system known as the host controller 167. The host controller 167 and USB system software provides the interface on the USB network and the host personal computer between the device and the specific software controlling that device. The host controller 167 controls all accesses to USB resources for sending and receiving all packets to and from these devices. The system software in conjunction with the root hub and any additional hubs, track the bus topology and manages all addressing of devices and routing of data from client software utilizing the device and the device itself. When client software at the host wishes to communicate with some USB device, it does so by interacting with the USB system software. The USB system software interacts with the host controller 167. The host controller 167 sends and receives signals over the USB bus to and from the USB device and the endpoints on the device. One or more hubs may be intermediate between the host controller 167 and the USB device. At the USB device, a USB interface layer receives the signals. This layer transmits framed data to the device, which routes data to and from the various endpoints on the device. The interfaces which consist of endpoints provide the functionality. In some cases these interfaces are grouped together into "functions," for example, the speaker function of speaker 197 or a keyboard function of keyboard 162 or the two functions of a single device containing a keyboard and a mouse.

All USB devices present a standard USB interface in terms of their comprehension of the USB protocol, their response to standard USB operations, and their standard capability descriptive information. These interfaces are generally defined by the USB Device Working Group Standards body, although vendor specific custom interfaces may also be defined.

The bus, shown as the lines connecting objects in FIG. 2, is a polled bus. The computer 110, through host controller 167, initiates all data transfers. One such type of transfer is the interrupt transfer. An interrupt transfer is used for small data, non-periodic, low frequency, and bounded-latency. Interrupt transfers provide a guaranteed maximum service period for the connection and retry of transfer attempts at the next period. For example, the polling of the keyboard for keystrokes is handled using this type of USB transfer.

A USB transaction begins when an application at the host requests a transfer to or from a device from the host controller 167. Host controller 167 sends a USB packet describing the type and direction of transaction, the USB device address and an endpoint number. This is the "token packet." Each USB device is referenced by a USB address that is assigned when the device is attached and enumerated to the host controller 167. Each USB device uses the address information included in the token to determine whether it is the target of the token sent by the host. The endpoint number defines the endpoint and therefore the interface in which that endpoint resides (or in the colloquial terms, the function) of the USB device to which the communication is directed.

Next, in the data packet phase, data is transferred to the host from the endpoint, or from the host to the endpoint, according to the instructions in the token packet. If the token is an IN token, the host is requesting information from the endpoint. If the token is an OUT token, the host is indicating that it will send information to an endpoint.

If the token is an IN token, yet there is no data to be transferred from the addressed device, a NAK packet to that effect is sent by the endpoint in place of data. For example, if keyboard 162 is being polled, but no keystrokes have occurred, a NAK (negative acknowledgement) is sent. If the endpoint is stalled, STALL is sent. If there is data to be sent, that data is sent. In response, if the data is received, the host will send an ACK handshake.

Where an OUT token has been sent, and data was sent from the host to the endpoint, the endpoint will send an ACK packet to acknowledge the data if it was received successfully. The STALL handshake can be sent if the endpoint is stalled and could not receive the data. If the endpoint does not receive the data, a NAK is sent.

A SETUP command is a type of out transaction that causes a command (sent in the data phase) to be executed on the endpoint.

A complete description of the USB protocol is contained in the USB specification, which is a publicly available document. The document is available on the USB Implementers Forum website, at www.usb.org.

Dynamic Substitution of USB Data

The methods and systems of the invention implement security in communications between a secure component and a device, such as a USB device, across a network. The security module of the invention may be located within a USB device, and will be described mainly with reference to a USB system, however, it is contemplated that any operable connection between a host and device may be implemented according to the invention. For example, any connection comprising one or more of a local bus, a network (such as a Local Area Network (LAN) or other network) and a USB bus may utilize the invention.

Figure 3A:
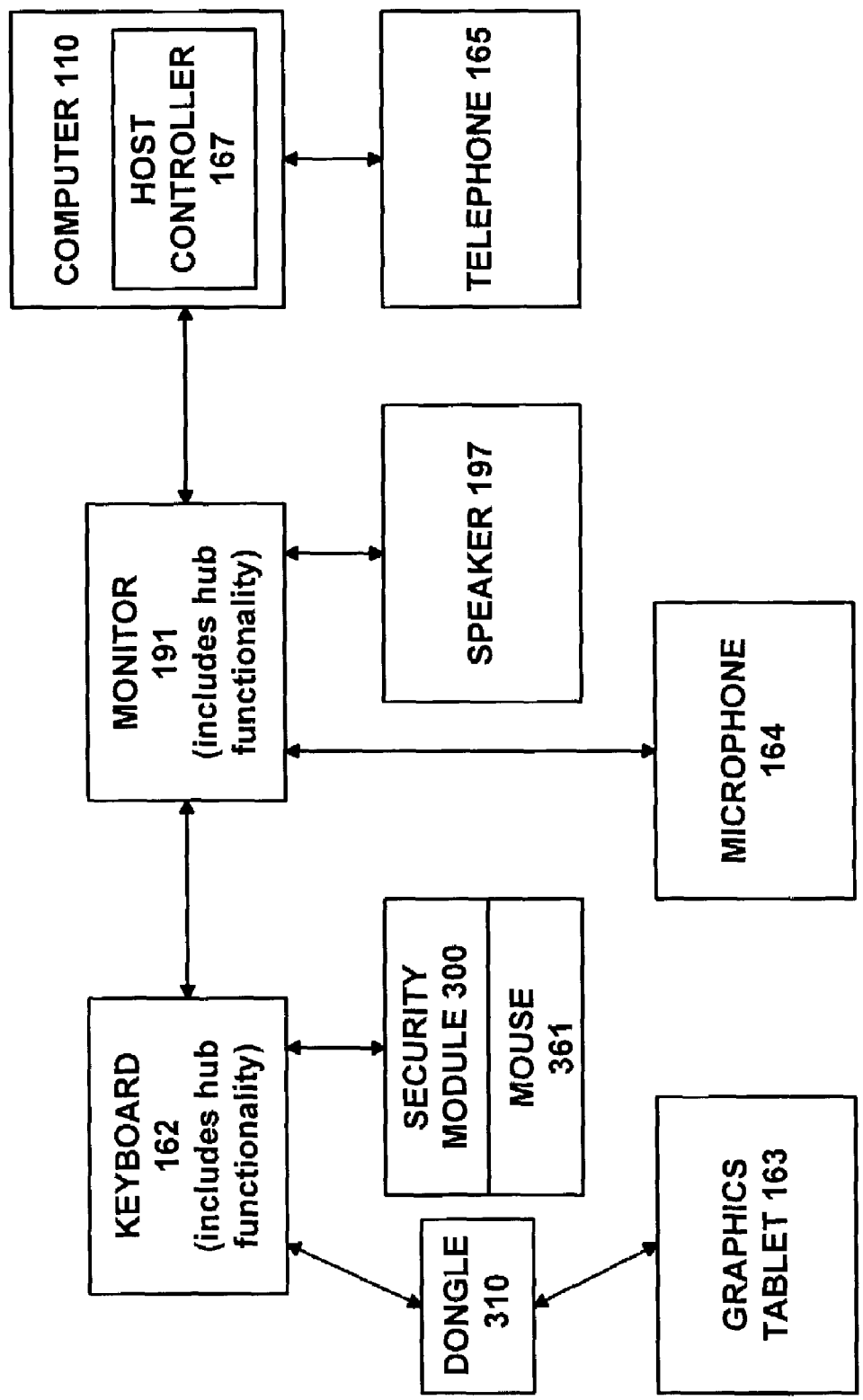
FIG. 3(A) is a block diagram representing a computer system including a dongle and integrated security module according to one embodiment of the invention.

FIG. 3(A) is a block diagram representing a computer system including a dongle and integrated security module according to one embodiment of the invention. The system depicted in FIG. 3(A) may also include one or more of the following: a keyboard 162, a monitor 191, a computer 110 including a controller 167, a speaker 197, a telephone 165, a graphics tablet 163 and a microphone 164, as described above with respect to FIG. 2. In the system depicted in FIG. 3(A), according to the invention communications are secured between a secure component in computer 110 and mouse 361 and between the secure component and graphics tablet 163. Mouse 361 includes an integrated security module 300, and communications with the secure component are mediated by the security module. In the system of FIG. 3(A), to secure communications with graphics tablet 163, a dongle 310, physically separate from the graphics tablet 163, mediates connections between graphics tablet 163 and the secure component. The security module is contained in the dongle 310. A security module may be implemented at any point in the USB system. Communications on the USB network upstream (towards the host) of the security module or dongle are protected, but communications downstream (away from the host) of the security module or dongle may be vulnerable.

Because of the physical layout of the system, all communications between the host and the device protected pass through the security module. In alternative embodiments the security module could be integrated into a dongle, an upstream hub, or the secured device itself. Generally, any encryption scheme that generates unreadable or verifiable data is useful for securing the system. In one embodiment, a key pair system, with both the secure component communicating with the device and the security module having key information is contemplated. According to one embodiment, in order to initialize the encryption/decryption capabilities, the secure component and the security module share a partnership key. One way for this partnership key to be shared between the two devices is for the secure component to securely display key information and the security module to then accept input from a downstream keyboard or other input device to set the partnership key. For example, the secure component may display the partnership key on a secure monitor or other output device. Then, if the security module is attached to or incorporated into a keyboard, that keyboard may be used to enter the partnership key. In other embodiments, the shared partnership key may also be hardware encoded into both the device and the secure component, may be burned into both the device and installed into secure component software during factory install time (or at first boot after being build), or may be displayed by the security module and input to the secure component by randomly placing buttons on the screen to be selected by the user with a mouse, thus preventing an adversary from eavesdropping on the information. In one embodiment, the partnership key is used as the key to encrypt and decrypt data, as well as to validate commands from the secure component to the security module.

In one embodiment of the invention, the host (computer 110) includes secure software as the secure component which will command the device. In this embodiment, the secure software does not have direct control of the device in question, but must communicate with the device through the insecure bus and possibly insecure areas of the host. For example, if the host allows secure processes, the secure software may be running as a secure process on the host. Commands being issued from the secure software must be encrypted or signed before the command is sent to the insecure areas of the host and across the insecure bus. In this way, security is achieved even while data is being passed via possibly vulnerable areas of the host or the bus.

Figure 3B:
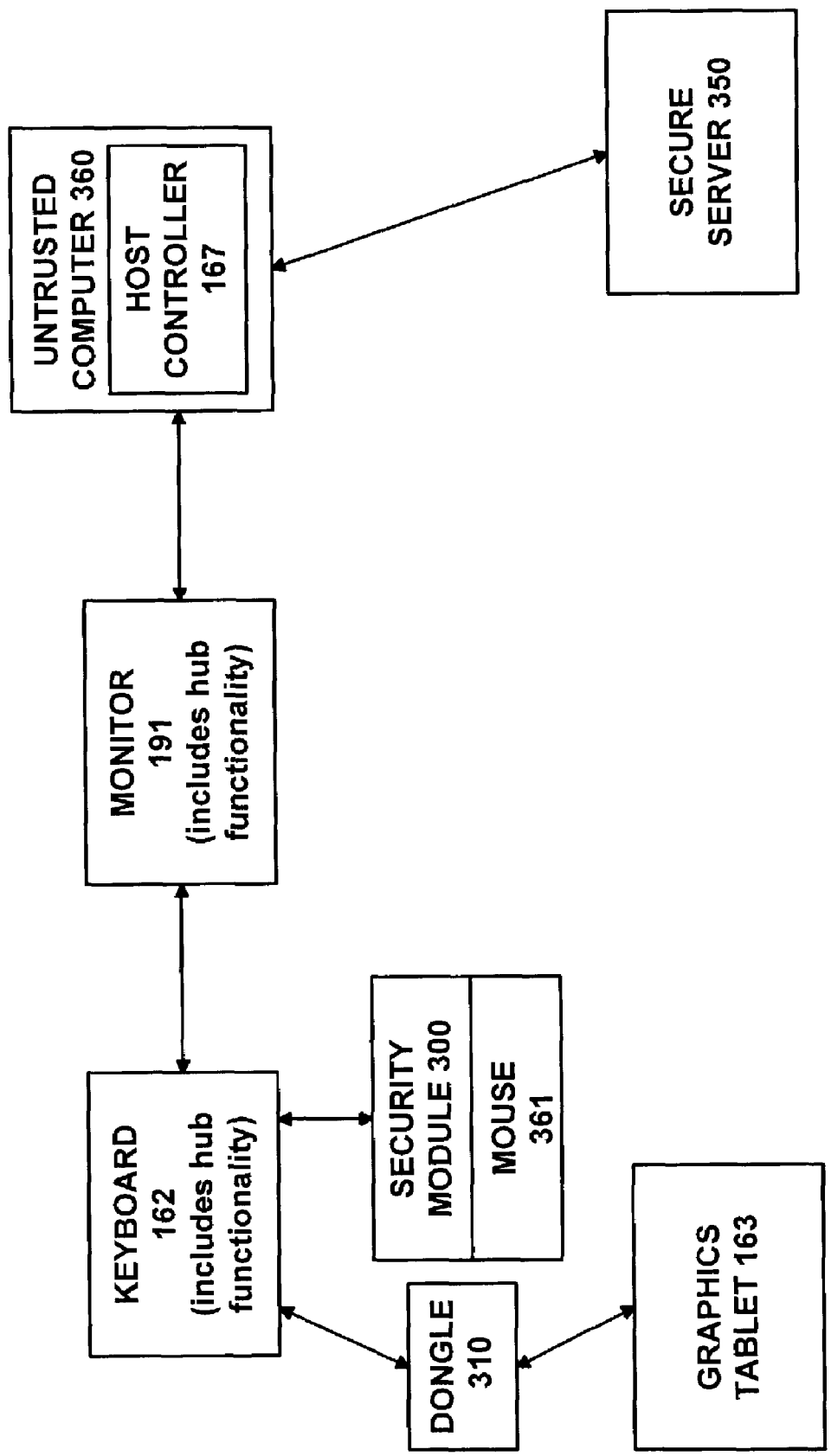
FIG. 3(B) is a block diagram representing a computer system including a dongle and integrated security module according to another embodiment of the invention.

In the system depicted in FIG. 3(b), according to the invention, the secure component is secure server 350, a trusted computer running software which requires secure communication with the user via the mouse 361 including an integrated security module 300 and the graphics tablet 163. Untrusted computer 360, which contains the host controller 167, may be vulnerable to attack, as may the connections between untrusted computer 360 and secure server 350, untrusted computer 360 and monitor 191, monitor 191 and keyboard 162, and between keyboard 162 and dongle 310. However, because the information sent between the secure server 350 and the mouse 361 and between the secure server 350 and the graphics tablet 163 are secured according to the invention, the vulnerability of these connections and intermediaries do not render insecure the communication between the secure server 350 and these devices.

In order to implement decryption/encryption, in another one embodiment, session keys are generated for each session between the secure component and the security module. This allows for increased security and is one defense against replay attacks. While encrypted data may be recorded and replayed, if the session key changes, the encrypted data is identified as unauthorized. A session is established between the secure component and the device or the security module. The secure component and the security module exchange data known as nonces. The secure component and security module each compute a hash function of these two nonces with the partnership key, which becomes a session key used to encrypt/decrypt. In one embodiment, the correct initialization is confirmed through the exchange of encrypted information.

Although the present invention is described with reference to the USB protocol, it will be appreciated that the invention has wider applicability, and can be practiced with any protocol similar to USB, as detailed below. For example, it can be used for devices being addressed using the IEEE-1394 standard.

Signal Transmission for on-the-Fly Encryption

According to the invention, when the secure component issues, via the host and bus, an IN token addressed to an endpoint which is beyond the security module, the security module checks to determine whether the USB address and endpoint, to which the IN token is addressed, is protected, or "seized". If the address and endpoint are not seized, the security module simply passes any information from the host to the endpoint and any information from the endpoint to the host (in the same manner that a USB hub repeats the data from an upstream port to a downstream port and vice versa.). However, if the endpoint is seized, the security module mediates between the secure component and the endpoint as seen in FIG. 4.

Figure 4:
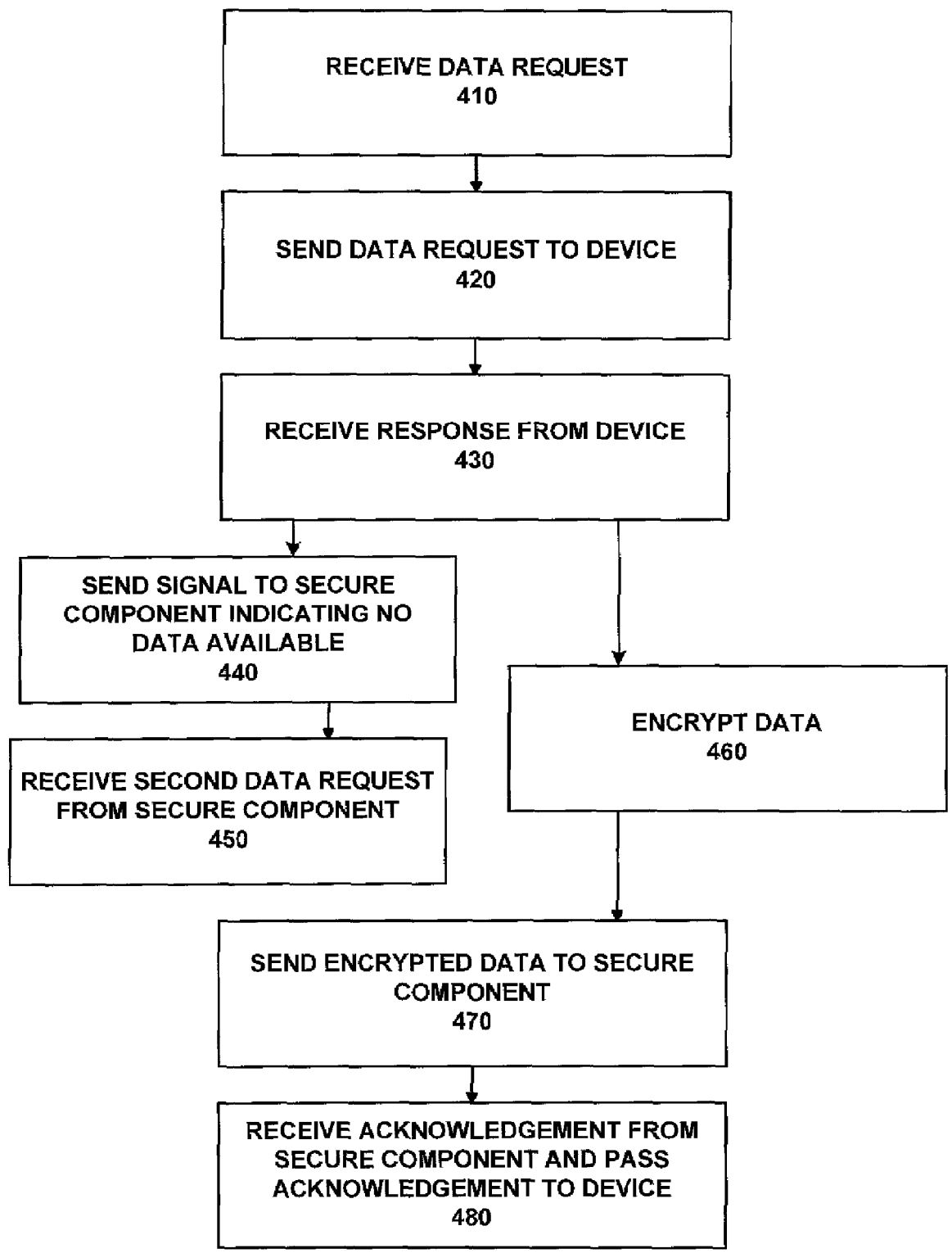
FIG. 4 is a flow diagram illustrating an IN transaction according to one embodiment of the invention.

As shown in FIG. 4, a data request is received by the security module from the secure component at step 410. Even if the address and endpoint to which the data request is directed are seized, the IN token is sent on to the seized endpoint at step 420. The security module then intercepts the requested data returned by the endpoint at step 430. Instead of passing this data to the bus, the security module sends a signal to the host that indicates that no data is available at step 440 (using a standard NAK packet) and waits to receive a second data request from the secure component at step 450. In the meantime, the security module encrypts the requested data at step 460. As with all interrupt endpoints on USB, the host system will subsequently retry the IN command. When the encryption is complete and the second data request has been received, the security module sends the encrypted data to the secure component as a response to the second data request at step 470. The second data request is not sent intact to the device address in question. Since the security device must continue to retransmit the bits as it is receiving those bits, it cannot determine that the next IN token is sent to a seized address until those bits have already been retransmitted on to the address and endpoint in question. Therefore the security device must corrupt the rest of the packet or cause it to be "smashed" when the dongle detects this condition. Therefore the USB endpoint will not return a new packet, since it did not receive a valid IN token; instead the dongle will reply for the device with the encrypted packet for the host. When an acknowledgement is received from the secure component for the data, the acknowledgement is passed on to endpoint at step 480.

Where this on-the-fly encryption is implemented on a host with secure and insecure areas, the information used to encrypt or sign the data should be kept by the host in the secure area, and the security module should contain the information needed to decrypt or verify the data. Where a shared partnership key is used as both encryption information and verification information, this partnership key is stored by the host in the secure area and the security module.

To implement this on a USB system, the data request is an IN token, the signal indicating that no data is available should be a NAK signal, and the acknowledgement is an ACK signal.

If, in step 430, the security module receives a signal indicating that the endpoint is in an error state (for example, in USB, a STALL signal), that signal is passed to the bus.

Signal Transmission for on-the-Fly Decryption

In one embodiment described above, all setup commands to the secured device (through the security module) are disallowed, and are smashed, as described above. This presents a problem when the secure component wants to send a legitimate setup command to the device. For this reason a mechanism for allowing certain setup command through the security module to the device must be created.

Figure 5:
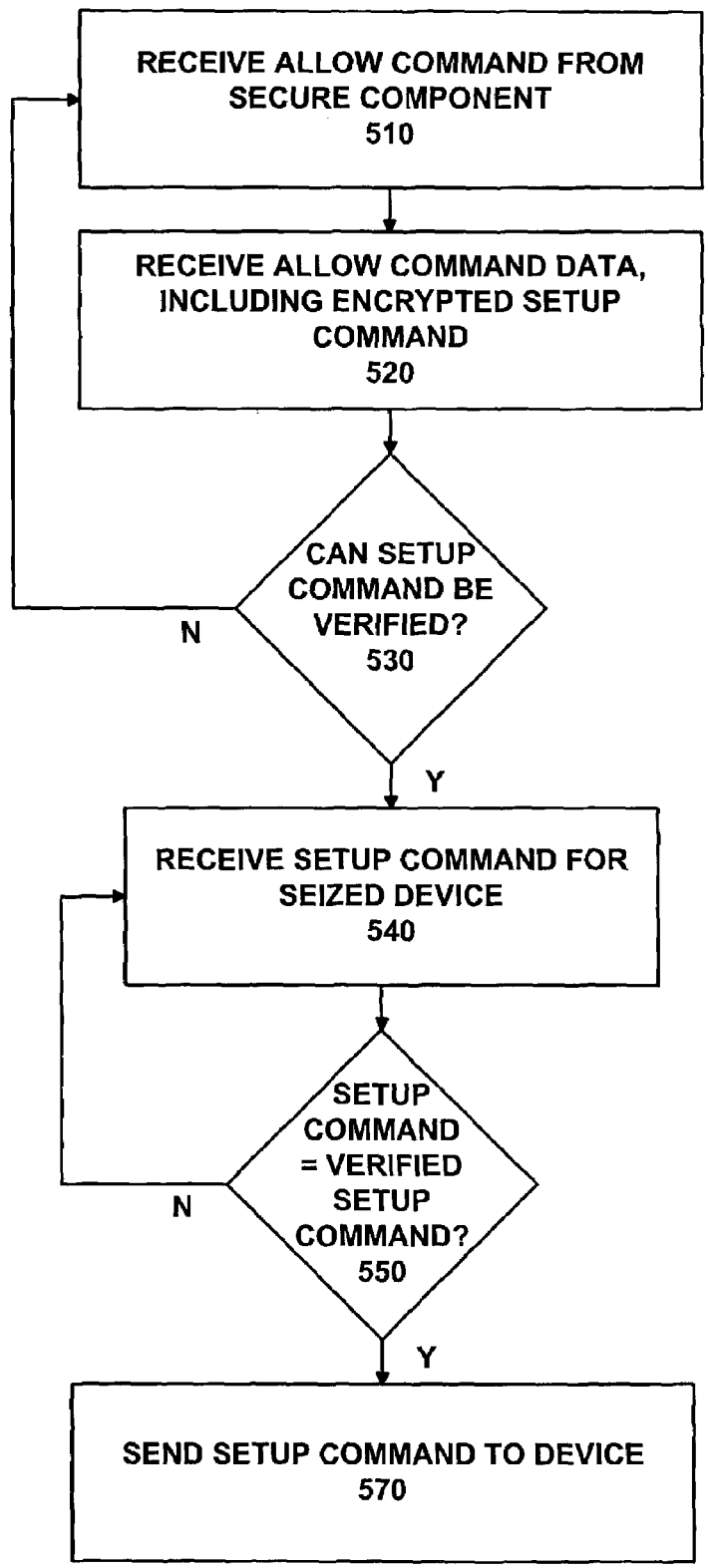
FIG. 5 is a flow diagram illustrating a SETUP transaction according to one embodiment of the invention.

According to the invention, a valid setup instruction to send a command to a secured endpoint is sent first to the security module by the secure component in an "allow" command. This command will be validated in the same way all other commands are sent to the security module from the trusted software. As shown in FIG. 5, an allow command is received by the security module from the secure component at step 510. This is followed by the receipt by the security module of allow command data sent from the secure component, including an encrypted setup command at step 520. An attempt is made to verify the encrypted setup command at step 530.

In another embodiment, the verification includes decryption of the setup command, producing a locally decrypted version of the setup command. In one embodiment, the allow command data received by the security module includes an unencrypted version of the setup command. The security module, to verify, compares this unencrypted version with the locally unencrypted version (550).

In still another embodiment, the encrypted setup command is a signed version of the setup command, and in verification the signature is tested to ensure that the setup command was signed with the shared key.

If verification is not successful, the setup command will not be sent to the endpoint. If the verification is successful, the security module waits to receive a setup command from the secure component at step 540. If the setup command matches the previously verified setup command (step 530), the command, along with a following data phase, is sent to the endpoint at step 570. If the setup command does not match, it is not sent through. Instead, the security module waits for a matching setup command.

CONCLUSION

In this way, while still using the USB protocol, encrypted data and commands may be passed from a secure component to an endpoint and from an endpoint to a secure component, while keeping the device secure from other kinds of reprogramming or reconfiguration.

As mentioned above, while exemplary embodiments of the present invention have been described in connection with various computing devices and network architectures, the underlying concepts may be applied to any computing device or system in which it is desirable to implement encryption/decryption of USB or similar communications. Thus, the techniques in accordance with the present invention may be applied to a variety of applications and devices.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for mediating data transfer between a device and a secure component, comprising:

receiving a first and second data request from the secure component at a security module;

after said receipt of the first data request at the security module, passing said first data request to said device;

receiving data in response to said first data request from said device at the security module;

after said receipt of said first data request at the security module, sending a deliberately false first signal to said secure component indicating that no data is available;

after said receipt of said data from said device, encrypting said data at the security module;

intercepting a second data request from said secure component to said device at the security module; and after intercepting said second data request, sending said encrypted data to said secure component and sending a deliberately smashed second signal to said device.

2. The method of claim 1, where said encryption is performed using a key, and where said secure component comprises a secure portion comprising a copy of said key for decryption.

3. The method of claim 1, where said device is a USB device, where said secure component is operably connected to a USB host, where said data request is a USB IN token, said data is USB data, and said signal to said secure component indicating that no data is available is a NAK signal.

4. The method of claim 1, further comprising:
after said sending of said encrypted data from the security module to said secure component, receiving an acknowledgement from said secure component;
after said receipt of said acknowledgement from said secure component at the security module, sending said acknowledgement to said device.

5. The method of claim 4, where said device is a USB device, where said secure component is operably connected to a USB host, and where said acknowledgement is an ACK signal.

6. The method of claim 1, where said data received from said device comprises a signal indicating that said device is in an error state, and where, after data is received from said device indicating that said device is in an error state, said sending a signal to said secure component indicating that no data is available is a signal indicating that said device is in an error state.

7. The method of claim 6, where said device is a USB device, said secure component is operably connected to a USB host, and said signal indicating that said device is in an error state is a STALL signal.

8. A method for mediating data transfer between a USB device and a secure component operably connected to a USB host, comprising:
intercepting data from said USB device responsive to a first IN token from said secure component at a security module;
sending a deliberately false first signal to said secure component from the security module indicating that no data is available;
encrypting said data at the security module;
intercepting a second IN token sent by said secure component for said USB device; and
in response to intercepting the second IN token, sending said encrypted data to said secure component and sending a deliberately smashed second signal to said device.

9. The method of claim 8, further comprising:
after intercepting said data from said USB device, sending an NAK signal to said secure component.

10. A security module for mediating data transfer between a device and a secure component, comprising:
means for receiving a first and second data request at the security module;
means for, after said receipt of the first data request, passing said first data request to said device;
means for, after said passing of said first data request to said device, receiving data from said device at the security module;
means for, after said receipt of said first data request, sending a deliberately false signal from the security module to said secure component indicating that no data is available;
means for, after said receipt of said data from said device, encrypting said data at the security module;
means for intercepting a second data request at the security module from said secure component to said device; and
means for, after said second data request, sending said encrypted data from the security module to said secure component and sending a deliberately smashed second signal to said device.

11. The security module of claim 10, where said device comprises said security module.

12. The security module of claim 10, where said security module comprises a hub.

13. The security module of claim 10, where a dongle comprises said security module, and where said dongle is operably connected to said secure component.

14. The security module of claim 10, where said encryption is performed using a key, where said security module comprises means for storing said key, and where said secure component comprises a secure portion comprising a copy of said key for decryption.

15. The security module of claim 10, where said device is a USB device, where said secure component is operably connected to a USB host, where said data request is a USB IN token, said data is USB data, and said signal to said secure component indicating that no data is available is a NAK signal.

16. The security module of claim 10, further comprising:
means for, after said sending of said encrypted data to said secure component, receiving an acknowledgement from said secure component;
means for, after said receipt of said acknowledgement from said secure component, sending said acknowledgement to said device.

17. The security module of claim 16, where said device is a USB device, where said secure component is operably connected to a USB host, and where said acknowledgement is an ACK signal.

18. The security module of claim 10, where said data received from said device comprises a signal indicating that said device is in an error state, and where, after data is received from said device indicating that said device is in an error state, said sending a signal to said secure component indicating that no data is available is a signal indicating that said device is in an error state.

19. The security module of claim 18, where said device is a USB device, said secure component is operably connected to a USB host, and said signal indicating that said device is in an error state is a STALL signal.

20. The security module of claim 10, where said secure component is located in a first computer system, where said device is located in a second computer system, where said first and second computer systems are operably connected, and where said operable connection comprises at least one of: a network, a local bus, and a USB bus.

21. The security module of claim 10, where said secure component comprises a secure software component running at least one secure process, and where said data transfer occurs between one of said at least one secure processes and said device.

22. A security module for mediating data transfer between a USB device and a secure component operably connected to a USB host comprising:
means for intercepting data from said USB device responsive to a first IN token from said secure component at a security module;
means for sending a deliberately false first signal to said secure component indicating that no data is available;
means for encrypting said data at the security module;

means for intercepting a second IN token sent by said secure component for said USB device at the security module; and means for sending said encrypted data from the security module to said secure component and sending a deliberately smashed second signal to said device.

23. The security module of claim 22, further comprising:

means for, after intercepting said data from said USB device, sending an NAK signal to said secure component.

24. A tangible computer-readable medium for mediating data transfer between a device and a secure component, said computer-readable medium having computer-readable instructions which, when executed by one or more processors, implement steps comprising:

receiving a first and second data request at a security module;

after said receipt of a first data request, passing said first data request to said device;

after said passing of said first data request to said device, receiving data from said device at the security module;

after said receipt of said first data request, sending a deliberately false signal from the security module to said secure component indicating that no data is available;

after said receipt of said data from said device, encrypting said data at the security module;

intercepting a second data request at the security module from said secure component to said device; and after said second data request, sending said encrypted data to said secure component and sending a deliberately smashed second signal to said device.

25. The computer-readable medium of claim 24, where said encryption is performed using a key, and where said secure component comprises a secure portion comprising a copy of said key for decryption.

26. The computer-readable medium of claim 24, where said device is a USB device, where said secure component is operably connected to a USB host, where said data request is a USB IN token, said data is USB data, and said signal to said secure component indicating that no data is available is a NAK signal.

27. The computer-readable medium of claim 24, said steps further comprising:

after said sending of said encrypted data to said secure component, receiving an acknowledgement from said secure component;

after said receipt of said acknowledgement from said secure component, sending said acknowledgement to said device.

28. The computer-readable medium of claim 27, where said device is a USB device, where said secure component is operably connected to a USB host, and where said acknowledgement is an ACK signal.

29. The computer-readable medium of claim 24, where said data received from said device comprises a signal indicating that said device is in an error state, and where, after data is received from said device indicating that said device is in an error state, said sending a signal to said secure component indicating that no data is available is a signal indicating that said device is in an error state.

30. The tangible computer-readable medium of claim 29, where said device is a USB device, said secure component is operably connected to a USB host, and said signal indicating that said device is in an error state is a STALL signal.

31. A tangible computer-readable medium for mediating data transfer between a USB device and a secure component operably connected to a USB host, said computer-readable medium having computer-readable instructions which, when executed by one or more processors, implement steps comprising:

intercepting data at a security module from said USB device responsive to a first IN token from said secure component;

encrypting said data at the security module;

sending a deliberately false signal to said secure component indicating that no data is available intercepting a second IN token at the security module sent by said secure component for said USB device; and sending said encrypted data to said secure component from the security module and sending a deliberately smashed second signal to said device.

32. The computer-readable medium of claim 31, said steps further comprising:

after intercepting said data from said USB device, sending an NAK signal to said secure component.

* * * * *